(12) United States Patent
Kanevsky et al.

(10) Patent No.: US 8,767,922 B2
(45) Date of Patent: *Jul. 1, 2014

(54) ELIMINATION OF TYPING NOISE FROM CONFERENCE CALLS

(71) Applicant: International Business Machines Corporation, Armonk, NY (US)

(72) Inventors: Dimitri Kanevsky, Yorktown Heights, NY (US); Bhuvana Ramabhadran, Yorktown Heights, NY (US); Abhinav Sethy, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/644,325

(22) Filed: Oct. 4, 2012

(65) Prior Publication Data

US 2014/0093059 A1    Apr. 3, 2014

Related U.S. Application Data

(63) Continuation of application No. 13/631,009, filed on Sep. 28, 2012.

(51) Int. Cl.
*H04M 1/24* (2006.01)
*H04M 3/08* (2006.01)
*H04M 3/22* (2006.01)
*H04N 7/14* (2006.01)

(52) U.S. Cl.
USPC ............... 379/32.01; 379/421; 348/14.08

(58) Field of Classification Search
USPC ............... 379/32.01, 202.01, 421; 348/14.08
See application file for complete search history.

(56) References Cited

U.S. PATENT DOCUMENTS

| 7,739,109 | B2 | 6/2010 | Rui |
| 2007/0016894 | A1 | 1/2007 | Sreedhar |
| 2008/0118082 | A1 | 5/2008 | Seltzer et al. |
| 2008/0279366 | A1 | 11/2008 | Lindbergh |
| 2010/0027810 | A1 | 2/2010 | Marton |
| 2010/0145689 | A1* | 6/2010 | Li et al. ................. 704/210 |
| 2010/0333069 | A1 | 12/2010 | Chandra et al. |
| 2011/0102540 | A1* | 5/2011 | Goyal et al. ........... 348/14.08 |
| 2011/0321016 | A1 | 12/2011 | Haviv et al. |
| 2012/0014514 | A1* | 1/2012 | Enbom et al. .......... 379/32.01 |
| 2012/0051533 | A1* | 3/2012 | Byrne et al. .......... 379/204.01 |

* cited by examiner

*Primary Examiner* — Quoc D Tran
(74) *Attorney, Agent, or Firm* — F. Chau & Associates, LLC; Anne V. Dougherty, Esq.

(57) ABSTRACT

A method for eliminating typing noise from a conference call in which a plurality of participants communicate via a plurality of client devices connected to a conference server via a corresponding plurality of channels, includes determining a probability value for each channel of the plurality of channels representing a likelihood of a typing noise being present on the corresponding channel. A channel of the plurality of channels having a highest determined probability value is temporarily muted. It is testing whether the temporary muting has successfully remove the typing noise from the conference call. A warning is generated for a client device of the plurality of client devices that corresponds to the channel having a highest determined probability value when it is determined that the temporary muting has successfully removed the typing noise from the conference call.

19 Claims, 4 Drawing Sheets

ELIMINATION OF TYPING NOISE FROM CONFERENCE CALLS

CROSS REFERENCE TO RELATED APPLICATIONS

This application is a Continuation of co-pending U.S. patent application Ser. No. 13/631,009, filed on Sep. 28, 2012, the entire content of which is incorporated herein by reference.

TECHNICAL FIELD

The present disclosure relates to conference calls and, more specifically, to the elimination of typing noises from conference calls.

DISCUSSION OF THE RELATED ART

Conference calling is the practice of conducting a telephone conversation with multiple participants. Teleconferencing is the practice of conducting remote conversation with at least some participants sharing a video stream in addition to an audio stream. Today conference calling and teleconferencing may be performed over the Internet rather than over traditional telephone lines. One popular approach for facilitating conference calling and teleconferencing is the client/server approach. According to this approach, a plurality of participants accesses a conference server that is responsible for establishing and maintaining the call.

The conference server may be reachable over the Internet or telephone lines so that participants may be able to contact the conference server by telephone or over the Internet. Participants may use a client device for connecting to the conference server. The client device may be a stationary telephone, a mobile phone, a speakerphone, a videophone, a personal computer, or any other communication device. Where a personal computer is used, the personal computer may incorporate various peripherals such as a microphone, video camera, speakers, display device, etc.

One common problem experienced in conference calling and teleconferencing is the sound of typing. Conference participants may have a tendency to type on a computer keyboard while participating in the call/teleconference and as a result, the sound associated with the typing may be a distraction to other conference participants.

Various systems have been designed to filter noises from conference calls and teleconference audio streams, however, many of these systems are ineffective.

SUMMARY

A method for eliminating typing noise from a conference call in which a plurality of participants communicate via a plurality of client devices connected to a conference server via a corresponding plurality of channels, includes determining a probability value for each channel of the plurality of channels representing a likelihood of a typing noise being present on the corresponding channel. A channel of the plurality of channels having a highest determined probability value is temporarily muted. It is testing whether the temporary muting has successfully remove the typing noise from the conference call. A warning is generated for a client device of the plurality of client devices that corresponds to the channel having a highest determined probability value when it is determined that the temporary muting has successfully removed the typing noise from the conference call.

The conference call may be a teleconference.

Determining the probability value may include applying one or more trained classifiers for recognizing the typing noise to each of the plurality of channels. Determining the probability value may include analyzing participant video captured from one or more of the client devices. Determining the probability value may include analyzing user input as to which of the plurality of participants is the source of the typing noise.

Determining the probability value may include determining an identity of a participant of the plurality of participants. Determining the identity of the participant may include matching a pattern of the typing noise to learned patters of typing noises for one or more of the participants of the plurality of participants. Determining the identity of the participant may include matching a background noise associated with the typing noise to a learned background noise for one or more of the participants of the plurality of participants.

Determining whether the temporary muting has successfully remove the typing noise from the conference call may include comparing a level of typing noise in the conference call prior to the muting with a level of typing noise in the conference call during the muting.

The generated warning may be an audible warning sent along the channel corresponding to the client device corresponding to the channel having the highest probability value informing the corresponding participant of remedial action to be taken upon the continuation of the typing noise.

The method may be performed when a typing noise is automatically identified within the conference call. The method may be performed when a complain command is received from one or more of the participants of the plurality of participants. The complain command may be used in determining the probability values.

The channel having the highest probability value may be muted when additional typing noise is detected within the conference call after the warning has been generated.

The channel having the highest probability value may be disconnected from the conference call when additional typing noise is detected within the conference call after the warning has been generated.

When it is determined that the temporary muting has not successfully removed the typing noise from the conference call, additional channels or combinations of channels may be tested in accordance with the determined probability values until temporary muting successfully removes the typing noise from the conference call.

A method for eliminating typing noise from a conference call in which a plurality of participants communicate via a plurality of client devices connected to a conference server via a corresponding plurality of channels includes identifying a typing noise within the conference call by either automatically identifying the typing noise within the conference call based on matching a trained classifier to conference call audio or receiving a complain command from a participant of the plurality of participants indicating that the typing noise is within the conference call. When the typing noise is identified within the conference call, a probability value is determined for each channel of the plurality of channels representing a likelihood of a typing noise being present on the corresponding channel. A channel of the plurality of channels having a highest determined probability value is temporarily muted. It is tested whether the temporary muting has successfully remove the typing noise from the conference call. Remedial action is performed when it is determined that the temporary muting has successfully removed the typing noise from the conference call.

The remedial action may include generating a warning for a client device of the plurality of client devices that corresponds to the channel having a highest determined probability value. The client device of the plurality of client devices that corresponds to the channel having a highest determined probability value may be muted. The client device of the plurality of client devices that corresponds to the channel having a highest determined probability value may be disconnected.

A method for eliminating typing noise from a conference call in which a plurality of participants communicate includes identifying a typing noise within the conference call. A participant responsible for creating the typing noise is identified by matching characteristics of the identified typing noise with a priori knowledge of typing noise characteristics and associated participants. A warning is sent to the identified participant naming remedial action. The remedial action is performed when the typing noise continues after the sending of the warning.

The remedial action may include muting or disconnection from the conference call.

A method for eliminating typing noise from a conference call in which a plurality of participants communicate via a plurality of client devices connected to a conference server via a corresponding plurality of channels includes monitoring the conference call for the presence of the typing noise. A pattern of the typing noise is matched to learned patters of typing noises for one or more of the participants of the plurality of participants. A probability value is determined for each of the plurality of participants representing a likelihood of the typing noise originating from each participant based on the matched pattern of the typing noise. A warning is generated for a client device of the plurality of client devices that corresponds to the participant having a highest determined probability value.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
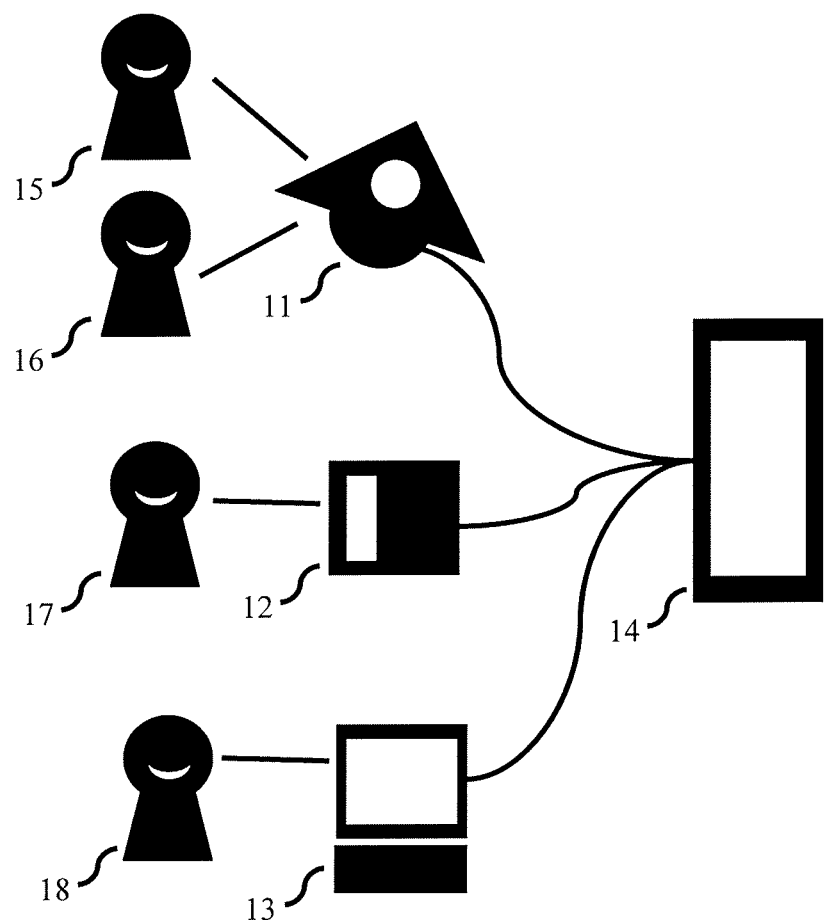
FIG. 1 is a block diagram illustrating a system for eliminating the presence of typing noise from conference calls and teleconference audio streams in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide systems and methods for eliminating the presence of typing noise from conference calls and teleconference audio streams. Rather than to filter out the typing noise directly, which may have only limited success, exemplary embodiments of the present invention seek to influence participant behavior so that the typing noise is not created in the first place.

FIG. 1 is a block diagram illustrating a system for eliminating the presence of typing noise from conference calls and teleconference audio streams in accordance with exemplary embodiments of the present invention.

There may be multiple client devices 11-13 such as a speakerphone 11, a telephone 12, and a personal computer system 13. Each of the client devices 11-13 may be connected to a conference server 14. The client devices 11-13 may be connected to the conference server 14 either via the telephone network or via a computer network such as the Internet. A plurality of participants 15-18 may participate in the conference via their respective client devices 11-13. Each participant may have exclusive use of a client device. For example, participant 17 is the exclusive user of the telephone 12 and participant 18 is the exclusive user of the personal computer 13. Also, multiple participants may share a client device. For example, participants 15 and 16 share use of the speakerphone 11.

The conference server 14 may be embodied as a discrete device such as a teleconferencing appliance or may be embodied as a cloud service, for example, as a virtual machine running within a server farm. The conference server 14 may be connected to the Internet and to the telephone system. The connection to the telephone system need not be physical as the conference server 14 may communicate with a IP phone service over the internet and the IP phone service may be responsible for receiving calls over the telephone network and transmitting those calls to the conference server 14 over the Internet.

The conference server 14 may include circuitry and programming for creating the call, validating participants to the call, receiving the audio and/or video telemetry from the participants and broadcasting a mixed audio and/or video signal to each participant. The conference server 14 may also maintain a user interface for facilitating these and other functions.

Figure 2:
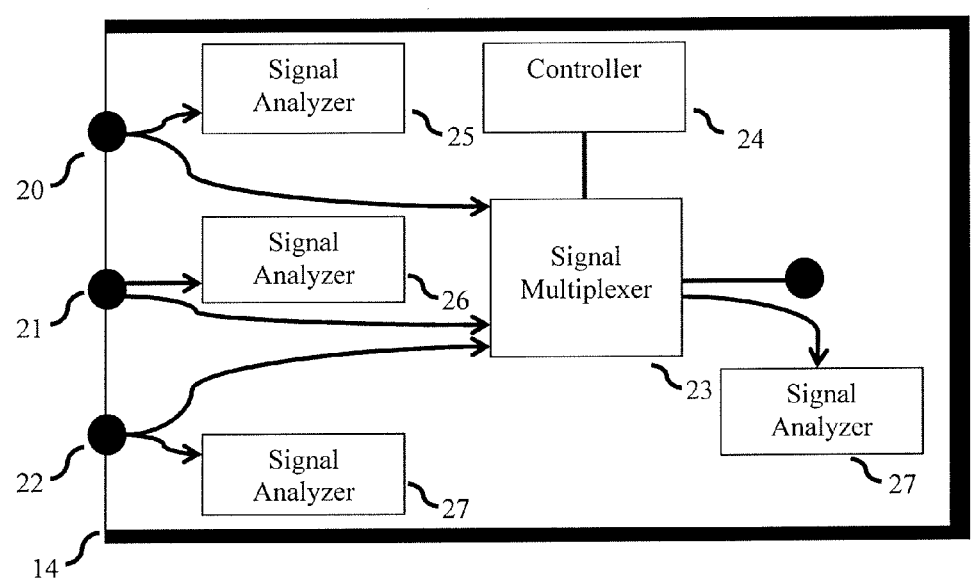
FIG. 2 is a block diagram illustrating a conference server according to exemplary embodiments of the present invention.

FIG. 2 is a block diagram illustrating a conference server according to exemplary embodiments of the present invention. The conference server 14 may include a plurality of channel nodes 20-22. Each channel node is a channel for receiving audio and/or video from a corresponding client device. The conference server may also include a signal multiplexer 23 for combining the audio signals received from each channel node 20-22. The conference server 14 may also include a controller 24. The controller 24 may incorporate programming logic and may be embodied as a computer system such as a system-on-chip device. The controller 24 may also include a storage device for storing programming code for performing its functions.

The controller 24 may control the signal multiplexer 23 by instructing the signal multiplexer on which audio streams to combine and which to block. The controller 24 may also include the logic for establishing and maintaining the conference, validating participants, connecting and disconnecting participants from the conference, and creating a video feed incorporating any video streams received from the client devices via the channel nodes 20-22.

Figure 3:
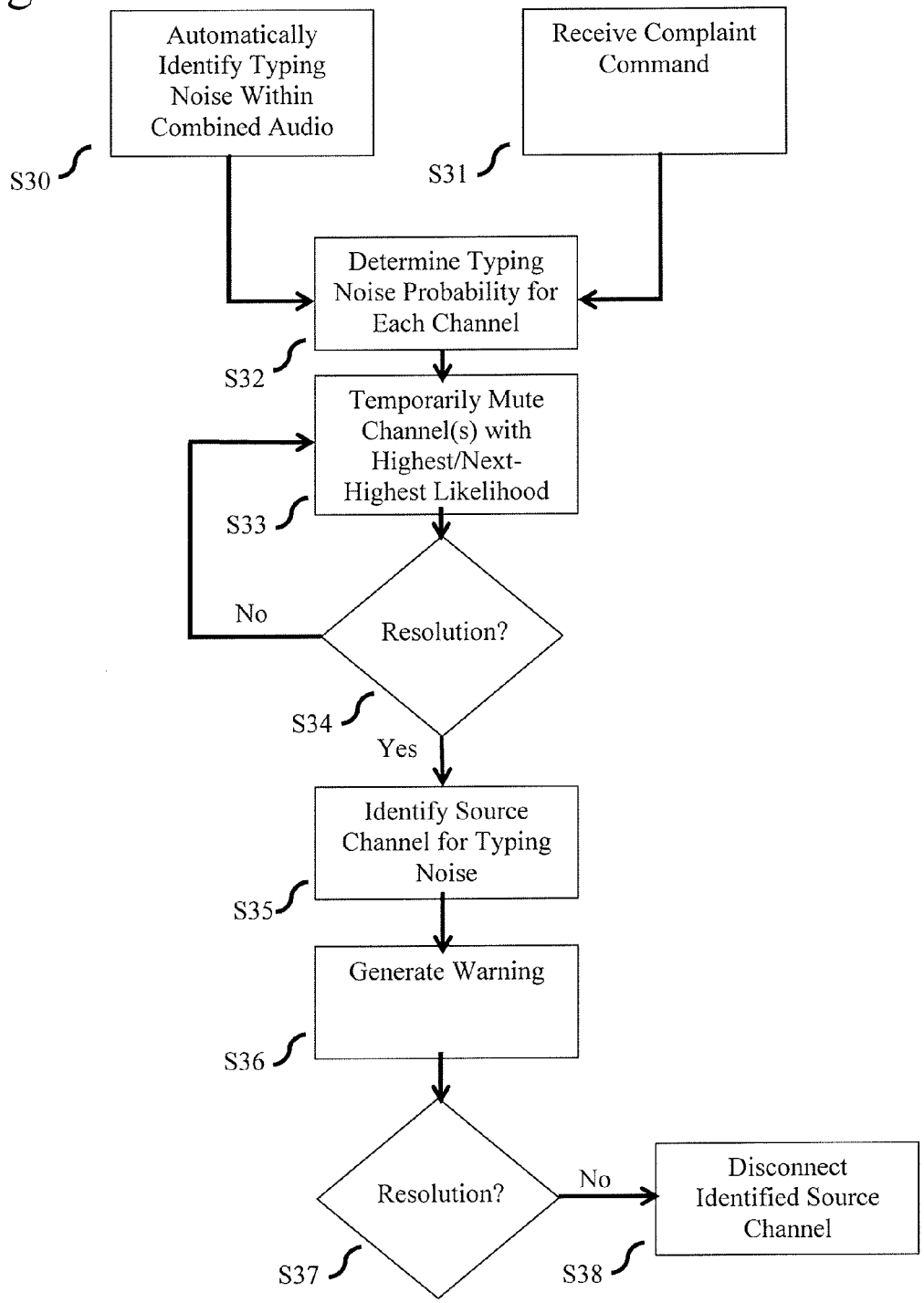
FIG. 3 is a flow chart illustrating a method for the elimination of typing noise from a conference call or teleconference in accordance with exemplary embodiments of the present invention.

FIG. 3 is a flow chart illustrating a method for the elimination of typing noise from a conference call or teleconference in accordance with exemplary embodiments of the present invention. While a conference call may be seen as having at least three participants, exemplary embodiments of the present invention may be applied to calls having as few as two participants, even to the extent that such calls are not understood to be conference calls.

The conference server 14 may initiate and maintain a conference in a traditional manner unless and until a trigger occurs. There may be at least two different triggers that may engage typing noise elimination. The first trigger may be the automated identification of typing noise within the combined audio stream (Step S30). To automatically detect typing noise, the combined audio stream may be continuously monitored by a signal analyzer 27 that is connected to the signal multiplexer 23. The combined audio stream may be the audio signal produced by the signal multiplexer 23 under the control of the controller 24 and may include an audio signal of each channel node 20-22.

The signal analyzer 27 may operate under the control of the controller 24, and in some exemplary embodiments of the present invention, may be the same device as the controller 24. The signal analyzer may detect the presence of a typing noise within the combined audio stream without regard to which channel node 20-22 the typing noise originated from within.

A second trigger may be the receiving of a complaint command (Step S31) from one or more of the client devices 11-13. The complaint command may be an indication manually provided by a participant to the conference server 14, for example, the controller 24, that typing noise is present in the combined audio stream, which the signal multiplexer 23 provides to each client device 11-13 via a corresponding channel node 20-22. The client devices 11-13 may be configured to receive a complain command from a participant and relay the complaint command to the conference server 14. Where the client device is a telephone 12, the command may be provided, for example, by the participant entering an appropriate numeric code. Where the client device is a personal computer 13, the command may be provided, for example, by the participant interacting with a user interface provided by client software installed on the personal computer 13 or by a user interface provided by the conference server 14 and accessed by the personal computer 13 using a web browser.

Additional triggers may be used as well. A single system may incorporate one or more possible triggers such as those discussed above. However, regardless of the trigger, once typing noise is known to exist in the combined audio stream, exemplary embodiments of the present invention employ an analysis to determine a probability value for each client device and/or conference participant. The probability value may be a measure of the likelihood that the typing noise has originated with that particular client device and/or conference participant.

Exemplary embodiments of the present invention may employ various techniques for determining a probability value for each client device and/or conference participant. Where each participant has exclusive access to a client device, determining a probability for each client device may be equivalent to determining a probability for each participant. However, where multiple participants are utilizing a single device, a probability value may be generated for each participant. However, this is not a requirement.

The probability value for each client/participant may be based on multiple factors. These factors may be developed by analyzing the combined audio stream from the signal multiplexer 23 and/or by analyzing the audio streams from the individual channel nodes 20-22. Analysis of the individual channel nodes 20-22 may be performed using corresponding signal analyzers 25, 26, and 27. The detection of a typing noise within a particular channel node may strongly influence the corresponding probability value. Conversely, detecting talking within a channel node may reduce a corresponding probability value on the assumption that a single participant is not likely to type and talk simultaneously.

Typing noise may be detected within the channel nodes and/or within the combined audio stream by using computer learning techniques by which identifiers/classifiers are trained using training data. The training data may be provided off-line during development from expert-identified samples and training may continue in use, for example, based on received complaint commands.

Where participant video is available, the participant's probability value may be influenced by the identification of typing action within the video stream. Conversely, a participant's probability value may be reduced where the video illustrates an action inconsistent with typing.

Moreover, where one or more participants provided a complaint command, the complaint command may include an indication of who is believed to be responsible for the tying noise and/or one or more participants may provide a separate identifying command for providing to the conference server 14 an indication of who is believed to be responsible for the typing noise. Additionally, providing a complaint command and/or identifying command may lessen the probability value for that participant under the assumption that then complaining parties would be less likely to be the source of the typing noise they are complaining about.

As discussed above, an individual participant may have a probability value representing the likelihood that typing noise is originating from the particular participant. A caller recognition system located within the conference server 14 may be used to recognize caller identity from his or her manner of typing which may be recognized using computer learning techniques that have been trained on training data. The caller recognition system may also be used to identify a particular participant based on an analysis of background noise on the channel. For example, channel noise characteristics may be indicative of an office environment, car environment, mobile phone environment, etc. Caller recognition may also be performed based on image recognition, where video imagery is available and/or by voice recognition, based on the audio stream.

After a probability value has been calculate for each participant and/or channel node, a value most indicative of a typing noise, for example, the highest value, may be selected and temporarily muted (Step S32). Where the highest value corresponds to a channel node, that channel node may be temporarily muted and where the highest value corresponds to a participant than the channel node on which the participant is provided from may be temporarily muted. Thereafter, analysis on the combined audio stream may be performed to determine whether the temporary muting of the audio stream of the channel node having the highest probability value was successful in removing the typing noise (Step S34). This determination may be made, for example, by comparing a probability value for the combined audio stream indicative of a likelihood of the presence of a typing noise with the stream with a similar value calculated during the temporary muting. If there is little to no statistically significant difference and/or the likelihood of the presence of the typing value exceeds a predetermined threshold, then it may be determined that there has been no resolution (No, Step S34). In that case, the channel with the next-highest probability value may be temporarily muted (Step S33) and the determination repeated (Step S34) until it is determined that there is a resolution (Yes, Step S34). However, if no resolution is found after temporarily muting each channel, then all possible combinations of channels may be temporarily muted, for example, starting with the two highest values, etc. Ultimately, if no resolution may be found, a general warning may be issued (Step S36) to all participants to stop the typing behavior.

Where the typing noise is resolved by the muting of one or more channels (Yes, Step S34), then the source of the typing noise is either identified or confirmed based on this assessment (Step S35). Thereafter, a warning may be generated and sent to the identified participant/channel node via the corresponding client device (Step S36). The warning may be an audible warning generated by a voice synthesizer unit included within the conference server 14. The audible warning may include a spoken request to discontinue a typing behavior. The audible request may be added to the audio stream sent only to the particular client device via the corresponding channel node so that the audible warning is not heard by participants at other client devices. The audible warning may also include a warning that disconnection may occur if the noise persists.

Where the identified source is a participant at a video-capable client device such as a videophone or a personal computer, a graphical warning may be used in place of or in addition to the audible warning. The graphical warning may include an icon and/or text. The text may warn the participant that typing noise has been detected and that participant may be terminated from the call if the noise persists.

The combined audio stream and/or the audio stream for the channel of the warned participant may be monitored continuously or periodically for some length time to verify that the typing noise has been resolved (Step S37). If the typing noise is not resolved (No, Step S38), then the offending channel node may be muted for some predetermined length of time or ultimately disconnected (Step S38). Thereafter, the disconnected participant may be permitted to rejoin the conference by calling in again.

Exemplary embodiments of the present invention may also take into consideration the identity of the offending party or other circumstances prior to warning, muting, or disconnection. For example, where the offending party is identified as either a conference organizer or the subject of the conference, remedial action including warnings, muting and disconnection may be avoided for that person. Additionally, the conference organizer may identify to the system various participants that are not to be remediated.

Additionally, in accordance with exemplary embodiments of the present invention, past history from current and/or other conference calls may be used to determine the probability that a channel and/or participant is the originator of a detected typing noise. This past history may include calls in which the same participants have previously participated in. Exemplary embodiments of the present invention may monitor multiple conference calls, simultaneously where desired, in which a particular participant is a party to so that the system may learn the behavior of this participant in terms of the noise generated. For example, if a user has the habit of chatting with his coworkers or family during the conference call the system may learn that this user repeatedly causes typing noise and in a future call when this caller participates the system attaches a higher probability value that this participant is responsible for the typing noise. In addition to past history exemplary embodiment of the present invention may also use information obtained from one or more social or role profiles of the participant in determining the probability values. The social profile may include using information which can either be derived from known information about the user (such as "isAManager," "isInMarketing," etc.), from an analysis of the call pattern or some existing social network. The system's prior knowledge of noise for the user may be influenced by data obtained from these sources.

Figure 4:
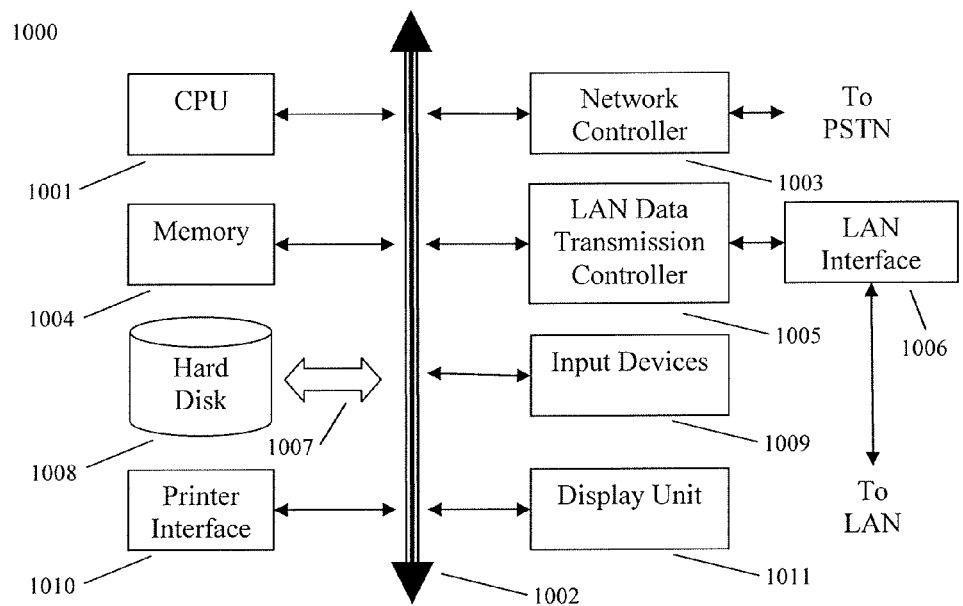
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be tangibly embodied as a computer program product comprising a computer readable storage medium having program code embodied therein, locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system for eliminating typing noise from a conference call, comprising:
 a conference server;
 a plurality of client devices in communication with the conference server, each via a corresponding channel of a plurality of channels; and
 a controller within the conference server configured to:
 determine a probability value for each channel of the plurality of channels representing a likelihood of a typing noise being present on the corresponding channel;
 temporarily mute a channel of the plurality of channels having a highest determined probability value;
 test whether the temporary muting has successfully remove the typing noise from the conference call; and
 generate a warning for a client device of the plurality of client devices that corresponds to the channel having a highest determined probability value when it is determined that the temporary muting has successfully removed the typing noise from the conference call.

2. The system of claim 1, wherein the plurality of client devices includes a telephone.

3. The system of claim 1, wherein the plurality of client devices includes a computer system.

4. The system of claim 1, wherein determining the probability value includes applying one or more trained classifiers for recognizing the typing noise to each of the plurality of channels.

5. The system of claim 1, wherein determining the probability value includes analyzing participant video captured from one or more of the client devices.

6. The system of claim 1, wherein determining the probability value includes analyzing user input as to which of the plurality of participants is the source of the typing noise.

7. The system of claim 1, wherein determining the probability value includes determining an identity of a participant of the plurality of participants.

8. The system of claim 7, wherein determining the identity of the participant includes matching a pattern of the typing noise to learned patters of typing noises for one or more of the participants of the plurality of participants.

9. The system of claim 7, wherein determining the identity of the participant includes matching a background noise associated with the typing noise to a learned background noise for one or more of the participants of the plurality of participants.

10. The system of claim 1, wherein determining whether the temporary muting has successfully remove the typing noise from the conference call includes comparing a level of typing noise in the conference call prior to the muting with a level of typing noise in the conference call during the muting.

11. The system of claim 1, wherein the generated warning is an audible warning sent along the channel corresponding to the client device corresponding to the channel having the highest probability value informing the corresponding participant of remedial action to be taken upon the continuation of the typing noise.

12. The system of claim 1, wherein the controller monitors the output of a multiplexer within the conference server that combines the plurality of channels automatically identify a typing noise.

13. The system of claim 1, wherein the client devices are configured to receive a complaint command from a participant and relay the received complaint command to the conference server.

14. The system of claim 13, wherein the complain command is used in determining the probability values.

15. The system of claim 1, wherein the controller disconnects the channel having the highest probability value from the conference call when additional typing noise is detected within the conference call after the warning has been generated.

16. The system of claim 1, wherein the controller uses past history from current or other conferences call where one or more of the participants has participated in determining the probability value.

17. The system of claim 1, wherein the controller uses a social or role profile of one or more of the participants in determining the probability value, the social or role profile being derived from known information about the one or more participants, from an analysis of a call pattern of the participants, or from a social network.

18. A computer program product for eliminating typing noise from a conference call in which a plurality of participants communicate via a plurality of client devices connected to a conference server via a corresponding plurality of channels, the computer program product comprising a computer readable storage medium having program code embodied therewith, the program code readable/executable by a computer system to:
- identify a typing noise within the conference call using a signal analyzer, by either automatically identifying the typing noise within the conference call based on matching a trained classifier to conference call audio or receiving a complain command from a participant of the plurality of participants indicating that the typing noise is within the conference call; and when the typing noise is identified within the conference call, the following steps are performed:
- determining a probability value for each channel of the plurality of channels representing a likelihood of a typing noise being present on the corresponding channel;
- temporarily muting a channel of the plurality of channels having a highest determined probability value;
- testing whether the temporary muting has successfully remove the typing noise from the conference call; and
- performing remedial action when it is determined that the temporary muting has successfully removed the typing noise from the conference call.

19. A computer program product for eliminating typing noise from a conference call in which a plurality of participants communicate via a plurality of client devices connected to a conference server via a corresponding plurality of channels, the computer program product comprising a computer readable storage medium having program code embodied therewith, the program code readable/executable by a computer system to:
- identify a typing noise, using a signal analyzer, within the conference call;
- identify a responsible participant, using a controller, the responsible participant being a participant responsible for creating the typing noise by matching characteristics of the identified typing noise with a priori knowledge of typing noise characteristics and associated participants, wherein the a priori knowledge includes information pertaining to typing noise generated by the responsible participant during one or more previous conference calls in which the responsible participant participated in;
- send a warning, though one or more of the client devices, to the identified participant naming remedial action; and
- perform the remedial action, using the controller, when the typing noise continues after the sending of the warning.

* * * * *